United States Patent
Blecha

(10) Patent No.: US 11,326,699 B2
(45) Date of Patent: May 10, 2022

(54) CONNECTING APPARATUS FOR THE CONNECTION OF A VALVE ROD TO A CLOSURE MEMBER OF A VACUUM VALVE

(71) Applicant: VAT Holding AG, Haag (CH)

(72) Inventor: Thomas Blecha, Feldkirch (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 17/159,570

(22) Filed: Jan. 27, 2021

(65) Prior Publication Data
US 2021/0231223 A1  Jul. 29, 2021

(30) Foreign Application Priority Data

Jan. 29, 2020 (DE) .......................... 10202010201.3

(51) Int. Cl.
| | |
|---|---|
| *F16K 3/314* | (2006.01) |
| *F16K 51/02* | (2006.01) |
| *F16K 3/18* | (2006.01) |
| *F16K 3/02* | (2006.01) |
| *F16K 1/48* | (2006.01) |
| *F16K 31/528* | (2006.01) |

(52) U.S. Cl.
CPC .............. *F16K 3/314* (2013.01); *F16K 1/48* (2013.01); *F16K 1/485* (2013.01); *F16K 3/0281* (2013.01); *F16K 3/18* (2013.01); *F16K 31/528* (2013.01); *F16K 51/02* (2013.01); *F16K 2200/101* (2021.08)

(58) Field of Classification Search
CPC .......... F16K 3/314; F16K 3/0281; F16K 3/18; F16K 51/02; F16K 1/48; F16K 2200/101; F16K 1/485; F16K 31/528; F16K 1/482; F16K 2200/10; F16D 3/16; F16D 3/26; F16D 3/265
USPC ..................................... 251/84–88, 326–329
See application file for complete search history.

(56) References Cited

U.S. PATENT DOCUMENTS

| | | | |
|---|---|---|---|
| 2,460,361 A | | 2/1949 | Petho |
| 2,848,187 A | * | 8/1958 | Henry ....................... F16K 1/20 251/85 |
| 2,948,503 A | | 8/1960 | Williams |
| 3,837,617 A | | 9/1974 | Eminger et al. |
| 7,134,642 B2 | | 11/2006 | Seitz |
| 9,228,615 B2 | * | 1/2016 | Grimmel ................. F16D 3/265 |

(Continued)

FOREIGN PATENT DOCUMENTS

DE 266759 2/1912

*Primary Examiner* — John Bastianelli
(74) *Attorney, Agent, or Firm* — Volpe Koenig

(57) ABSTRACT

A connecting apparatus for the connection of a valve rod (4) to a closure member (1) of a vacuum valve, with a connecting body (12) which is arranged between a first connecting part (10) and a second connecting part (11). The connecting body (12) has a basic shape of a Steinmetz body which is formed by way of a intersection of two circular cylinders. The connecting body (12) is arranged in an intermediate space between arm projections (24, 25) of the first connecting part (10) and in an intermediate space between arm projections (26, 27) of the second connecting part (11). Corresponding bearing faces (28, 29, 30, 31) of the arm projections (24, 25, 26, 27) bear against bearing faces (13, 14, 15, 16) of the connecting body (12). The two arm projections (24, 25, 26, 27) of the respective connecting part (10, 11) approach one another towards their free ends.

10 Claims, 6 Drawing Sheets

(56) References Cited

U.S. PATENT DOCUMENTS

| | | |
|---|---|---|
| 10,502,325 B2 | 12/2019 | Mayer |
| 2002/0013288 A1 | 1/2002 | Matsumoto et al. |
| 2002/0130288 A1 | 9/2002 | Duelli |
| 2011/0108750 A1 | 5/2011 | Ehme et al. |
| 2012/0305824 A1 | 12/2012 | Vollmer et al. |

* cited by examiner

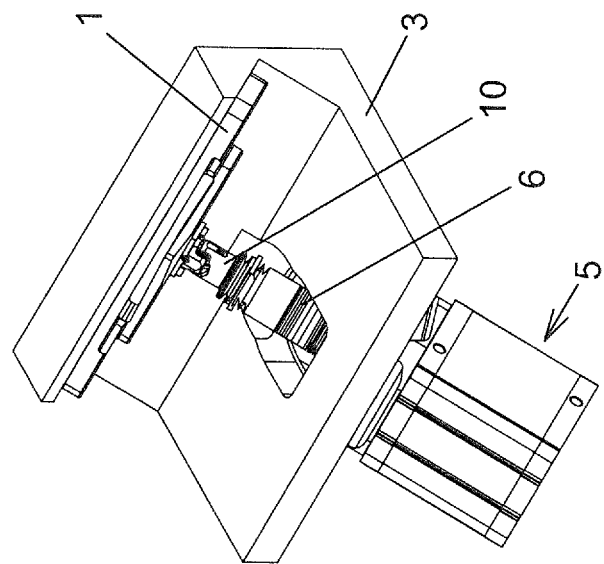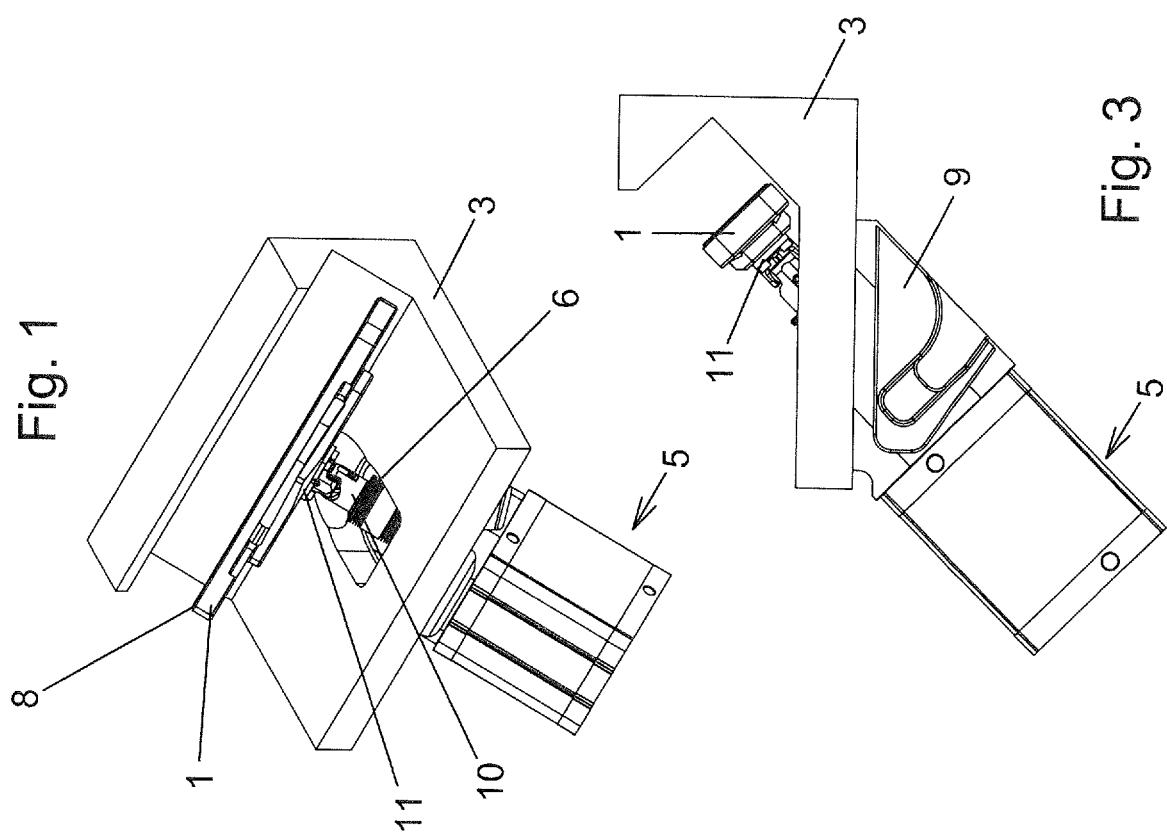

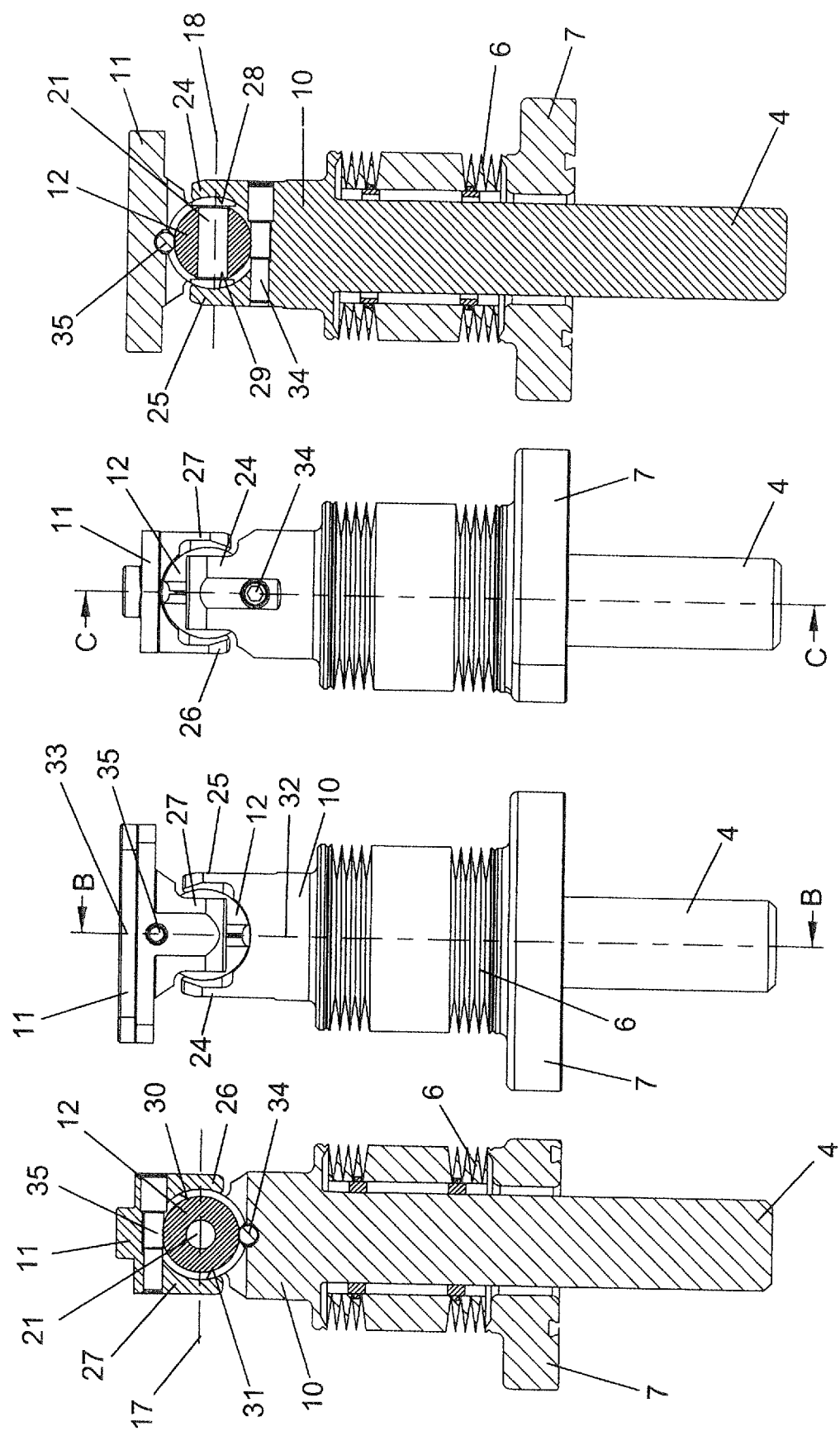

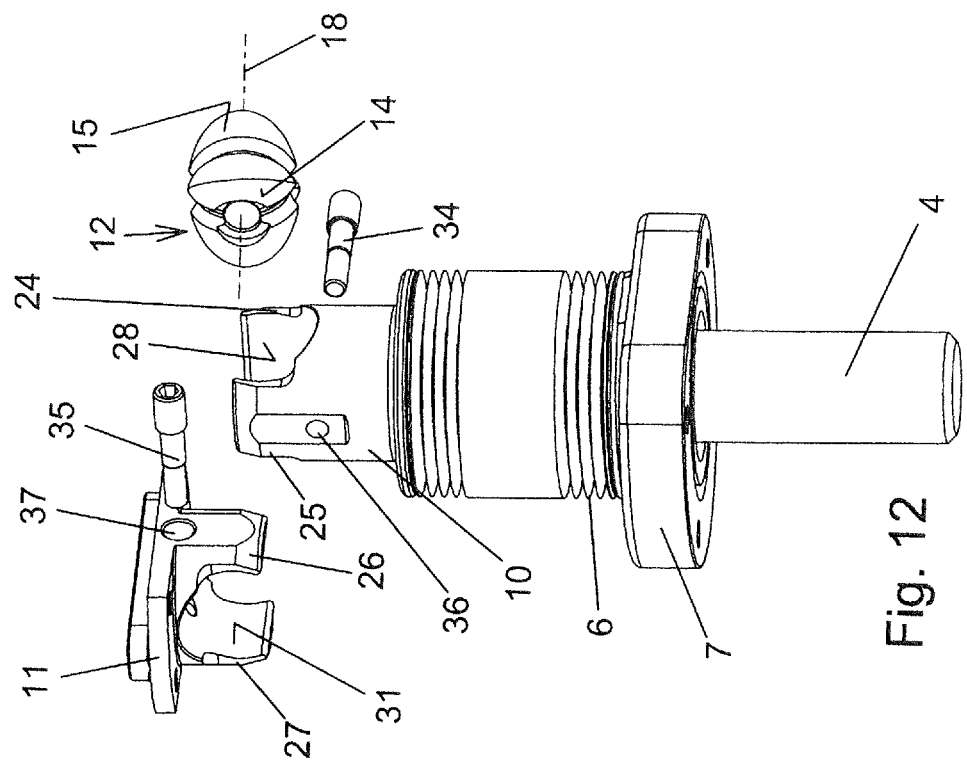
Fig. 10
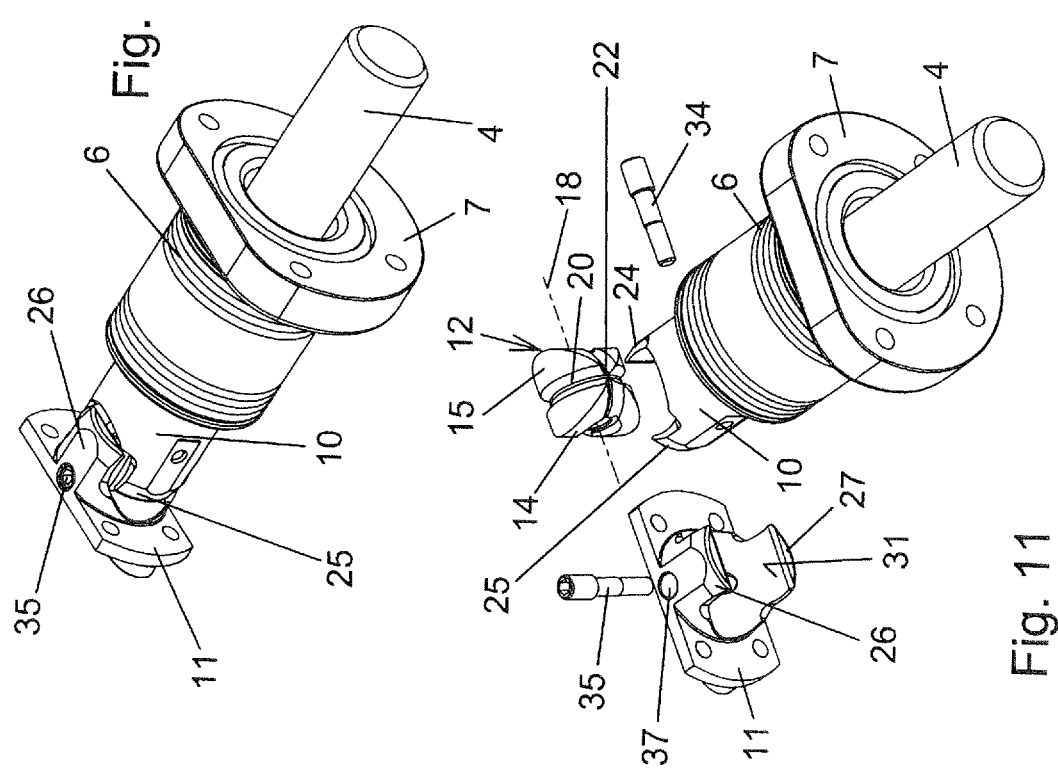
Fig. 11
Fig. 12

CONNECTING APPARATUS FOR THE CONNECTION OF A VALVE ROD TO A CLOSURE MEMBER OF A VACUUM VALVE

INCORPORATION BY REFERENCE

The following documents are incorporated herein by reference as if fully set forth: German Patent Application No. 10 2020 102 081.3, filed Jan. 29, 2020.

TECHNICAL FIELD

The invention relates to a connecting apparatus for the connection of a valve rod to a closure member of a vacuum valve, comprising a first connecting part which can be connected or is connected or is configured in one piece to/with the valve rod, a second connecting part which can be connected or is connected or is configured in one piece to/with the closure member, and a connecting body which is arranged between the first connecting part and the second connecting part.

Furthermore, the invention relates to a vacuum valve with a valve body which has a valve opening, and with a closure member which is supported by a valve rod and can be adjusted between an open position, in which the valve opening is released, and a closed position, in which the valve opening is closed by the closure member, the closure member being connected to the valve rod via a connecting apparatus.

BACKGROUND

In order to connect a closure member, which is usually of plate-shaped configuration, to a valve rod, screw connections between the closure member and the valve rod are known.

In order, despite tolerances present in the closed state of the vacuum valve, to achieve a homogeneous contact pressure of an elastic seal which is arranged between the closure member and a valve seat for the closure member in the closed state of the vacuum valve, the elastic seal generally being attached to the closure member, it is known for a movability of the closure member with respect to the valve rod to be made possible. Thus, for example, US 2002/0130288 A1 discloses a connecting apparatus between the valve rod and the plate-shaped closure member, which connecting apparatus has an elastic block with a force transmission part which is arranged therein. In the case of the closure member being pressed onto the valve seat, the closure member can pivot somewhat with respect to the valve rod as a result.

Further connecting apparatuses between a closure member and a valve rod, which connecting apparatuses permit a movement capability of the closure member with respect to the valve rod, are apparent from U.S. Pat. Nos. 7,134,642 B2 and 3,837,617.

US 2011/0108750 A1 discloses a connecting apparatus between a valve rod and a closure member, which connecting apparatus has a twistable crossmember. A certain amount of pivoting of the closure member with respect to the valve rod is made possible by way of twisting of the crossmember.

SUMMARY

It is an object of the invention to provide an advantageous connecting apparatus for the connection of a valve rod to a closure member of a vacuum valve, which connecting apparatus makes an adjustment of the closure member with respect to the valve rod possible about two axes which lie perpendicularly with respect to one another. According to the invention, this is brought about by way of a connecting apparatus with one or more of the features described herein. A vacuum valve having one or more features described herein is also provided.

The connecting apparatus according to the invention has a connecting body with a basic shape of a Steinmetz body, the Steinmetz body being formed by way of an intersection of two circular cylinders. The connecting body therefore has primary bearing faces which are formed by sections of a cylindrical surface which surrounds a first axis, and secondary bearing faces which are formed by sections of a cylindrical surface which surrounds a second axis which lies at a right angle with respect to the first axis.

The connecting body is arranged in an intermediate space between arm projections of the first connecting part and in an intermediate space between arm projections of the second connecting part. The arm projections of the first connecting part have primary corresponding bearing faces which are formed by sections of a cylindrical surface which surrounds the first axis, and the arm projections of the second connecting part have secondary corresponding bearing faces which are formed by sections of a cylindrical surface which surrounds the second axis. The primary corresponding bearing faces bear against the primary bearing faces of the connecting body, and the secondary corresponding bearing faces bear against the secondary bearing faces of the connecting body.

The arm projections of the first connecting part have sections which adjoin free ends of said arm projections and via which they approach one another toward their free ends. The arm projections of the second connecting part have sections which adjoin free ends of said arm projections and via which they approach one another toward their free ends. As a result, the connecting body is secured in a positively locking manner against being pulled off from the first connecting part in the axial direction of the first connecting part and against being pulled off from the second connecting part in the axial direction of the second connecting part.

As a result of the configuration according to the invention, the second connecting part has a movability with respect to the first connecting part about two axes which lie at a right angle with respect to one another and correspond to the axes of the two circular cylinders, by the intersection of which the Steinmetz body is formed. The closure member can therefore be adjusted with respect to the valve rod with regard to said two axes which lie at a right angle with respect to one another.

In one advantageous embodiment of the invention, the connecting body has a primary groove which lies in a plane which lies at a right angle with respect to the first axis, and a secondary groove which lies in a plane which lies at a right angle with respect to the second axis. A first clamping element which is fastened to the first connecting part protrudes into the primary groove, and a second clamping element which is fastened to the second connecting part protrudes into the secondary groove.

The engagement of the first clamping element into the primary groove establishes a positively locking connection between the connecting body and the first connecting part, which positively locking connection blocks the first connecting part from being pulled off from the connecting body in a direction parallel to the first axis. The engagement of the second clamping element into the secondary groove establishes a positively locking connection between the connecting body and the second connecting part, which positively locking connection blocks the second connecting part being pulled off from the connecting body in a direction parallel to the second axis.

The first and the second clamping elements are preferably of pin-shaped configuration, and are arranged in bores of the connecting parts. Here, the clamping elements favorably protrude in each case in a middle section of their longitudinal extent over at least one part of their diameter into the respective groove. It is preferred that the bore, in which the first clamping element is arranged, extends at a right angle with respect to the first axis, and the bore, in which the second clamping element is arranged, extends at a right angle with respect to the second axis.

The connecting body can advantageously be clamped between the first and the second clamping element. As a result, an expedient so-called sluggish movement can be achieved, that is to say the first connecting part can be adjusted with respect to the second connecting part only by way of a retaining force which is brought about by way of the clamping action of the connecting body being overcome. As a result, it can be achieved that the closure element is correspondingly set in the case of the first closure of the vacuum valve with said retaining force being overcome, and maintains said position in the further course. In the case of following closure operations, a further adjustment of the first connecting part with respect to the second connecting part therefore does not occur, as a result of which an undesired particle production in the vacuum is avoided.

BRIEF DESCRIPTION OF THE DRAWINGS

Further advantages and details of the invention will be described in the following text on the basis of the appended drawing, in which:

FIG. 1 shows a perspective view of a vacuum valve with a connecting apparatus according to the invention between the valve rod and the closure member, in the open position of the closure member, FIG. 2 shows a perspective view corresponding to FIG. 1, in the closed position of the closure member, FIGS. 3 and 4 show a side view and a front view, FIG. 6 shows a view of a part of the vacuum valve, comprising the connecting apparatus, the valve rod, the boot which surrounds the valve rod, and a flange which is attached to the boot, in a viewing direction at a right angle with respect to the valve rod, FIG. 7 shows a section along the line BB from FIG. 6, FIG. 8 shows that part of the vacuum valve which is shown in FIG. 6, but rotated by 90° about the longitudinal center axis of the valve rod, FIG. 9 shows a section along the line CC from FIG. 8, FIG. 10 shows a perspective view of that part of the vacuum valve which is shown in FIG. 6, FIGS. 11, 12, 13 and 14 show perspective views of that part of the vacuum valve which is shown in FIG. 6, the connecting apparatus being shown pulled apart in the manner of an exploded illustration, from different viewing directions.

DETAILED DESCRIPTION

Figure 5:
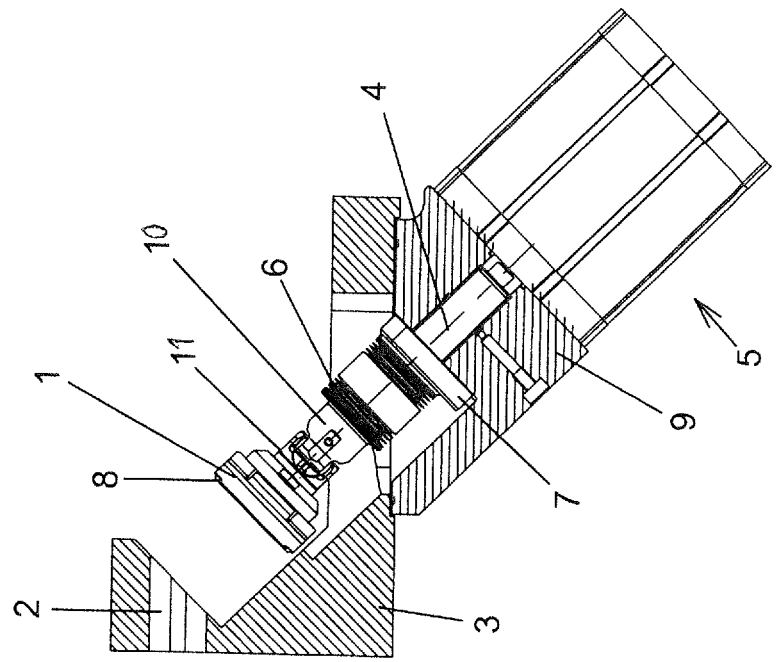
FIG. 5 shows a section along the line AA from FIG. 4 (only the body 3 and the connector piece 4 are sectioned)
Figure 4:
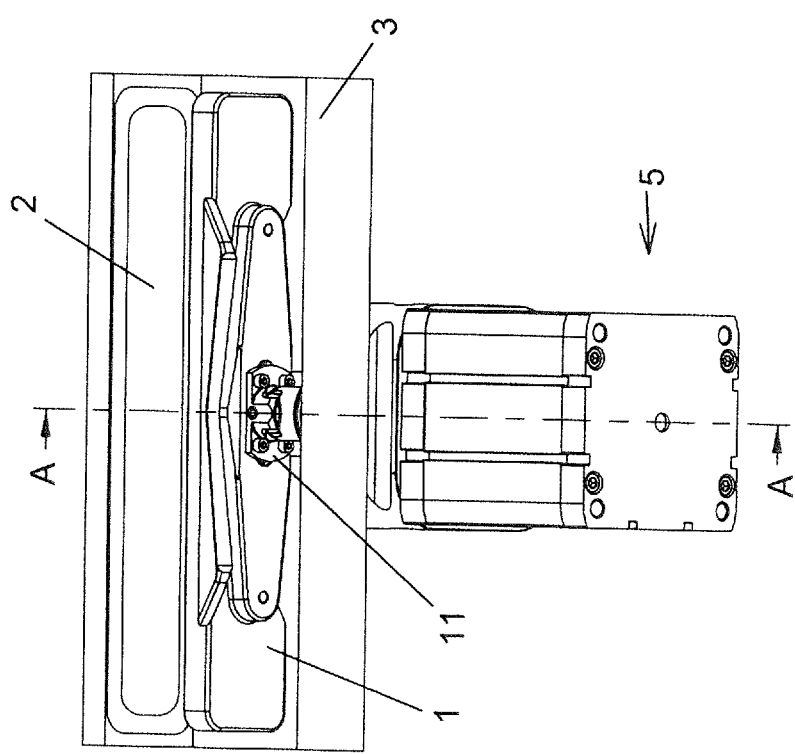
Figure 14:
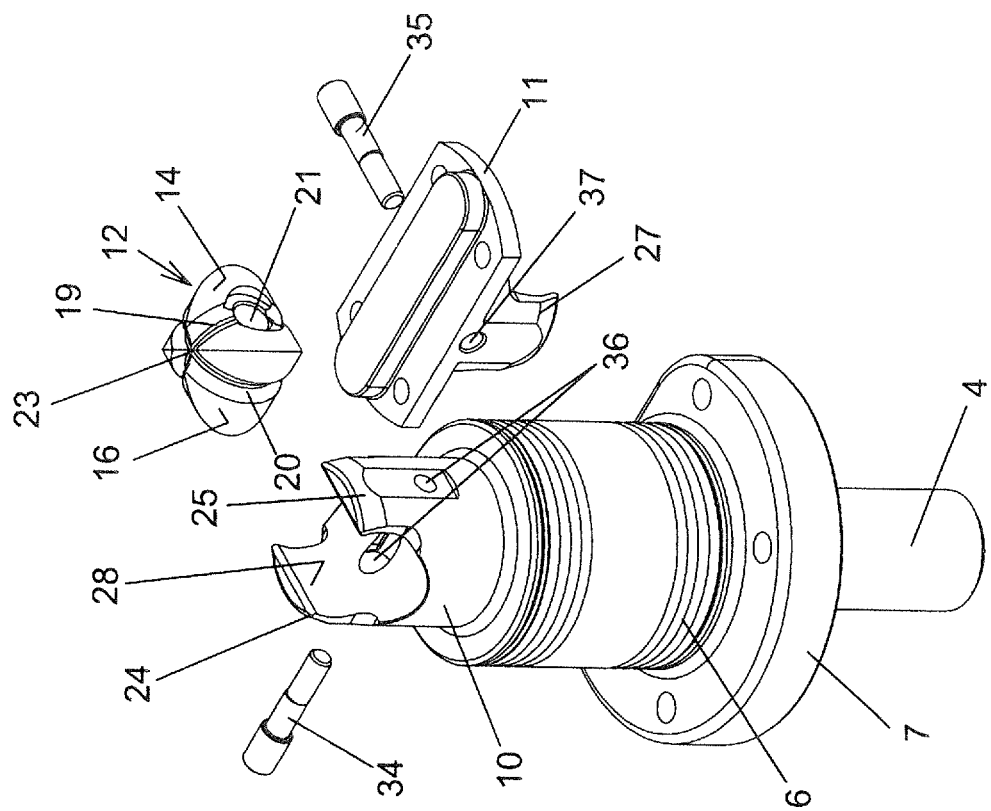
Figure 13:
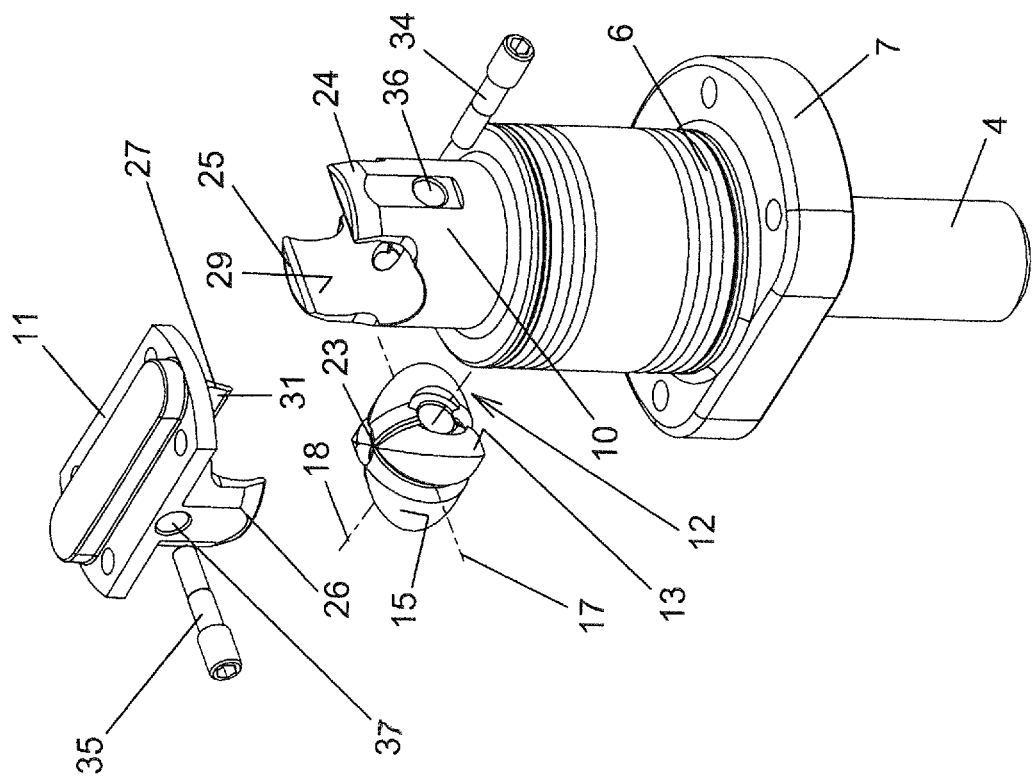

The figures have different scales and are shown in a partially simplified manner.

One exemplary embodiment of a vacuum valve with a connecting apparatus according to the invention will be described in the following text on the basis of FIGS. 1 to 16.

The vacuum valve has a plate-shaped closure member 1 which might also be called a valve plate or valve disk. The closure member 1 can be adjusted between an open position (FIG. 1) and a closed position (FIG. 2). A valve opening 2 is released in the open position of the closure member, and the valve opening 2 is closed by the closure member 1 in the closed position. The valve opening 2 is arranged in a body 3.

The closure member 1 is supported by a valve rod 4. In the exemplary embodiment, the adjustment of the closure member 1 between the open position and the closed position takes place merely by way of an axial adjustment of the valve rod 4. In modified embodiments of the invention, the closure member might also be adjusted between the open position and closed position in the manner of an L-shaped or J-shaped movement, for example by way of an axial displacement and subsequent tilting of the valve rod or displacement of the valve rod at a right angle with respect to its longitudinal axis, as is known.

A drive 5 which is formed in the exemplary embodiment by a pneumatic piston/cylinder unit serves for the adjustment of the valve rod 4, in order to adjust the closure member 1 between the open position and the closed position. The valve rod 4 is connected to the piston rod of said piston/cylinder unit, or is configured in one piece with said unit.

The valve rod 4 is guided in a sealed manner out of the vacuum region, in which the closure member 1 is arranged. A boot 6 serves for this purpose in the exemplary embodiment. One end of the boot is connected to the first connecting part 10 which is described further below, and the other end is connected to a flange 7 which can be connected to the body 3 in a vacuum-tight manner.

A sealing ring 8 made from an elastomeric material serves for sealing purposes between the closure member 1 and the body 3 in the closed state of the vacuum valve. Said sealing ring 8 is attached to the closure member 1 in the exemplary embodiment, as is preferred. The valve opening 2 is surrounded by a sealing face which forms the sealing seat, against which the sealing ring bears in the closed position of the closure member 1. A reversed arrangement (sealing ring on the body 3, sealing face on the closure member 1) is fundamentally also conceivable and possible.

The body 3 can be a vacuum chamber, of which in each case only one part is shown in FIGS. 1 to 5. A connector piece 9 is fastened to the vacuum chamber in the region of an opening (by way of screws which are not shown in the figures), a sealing ring which is arranged between the vacuum chamber and the connector piece 9 surrounding said opening in the vacuum chamber for the vacuum-tight connection. The drive 5 is fastened on the outside to the connector piece 9, and the valve rod runs through a channel in the connector piece 9, the flange 7 being fastened on the inner side to the connector piece (with a sealing ring which lies in between). A ventilating bore leads into the channel, and a guide bushing for guiding the valve rod 4 is arranged in the channel (not denoted in the figures).

In an alternative embodiment, the body 3 might be a valve housing, of which only one part is shown and which has a further opening, in order to configure a through channel through the valve housing in the open position of the closure member 1. A valve housing of this type might be connected, for example, between two vacuum chambers.

A configuration of the body 3 in the form of a valve body which is inserted into a vacuum chamber as an insert, with the result that the valve opening is flush with an opening in the chamber wall (a sealing ring which surrounds the valve opening 2 being arranged between the chamber wall and the body 3), is conceivable and possible.

A connecting apparatus serves for the connection of the valve rod 4 to the closure member 1. Said connecting apparatus comprises a first connecting part 10 which is connected to the valve rod 4, a second connecting part 11 which is connected to the closure member 1, and a connecting body 12.

The first connecting part 10 is connected rigidly to the valve rod 4, for example is screwed or welded. A single-piece configuration, that is to say a configuration made throughout from the same material, is also conceivable and possible.

The second connecting part 11 is connected rigidly to the closure member 1, in the exemplary embodiment is screwed to the said closure member 1. Welding is also conceivable and possible, or else a single-piece configuration, that is to say a configuration made throughout from the same material.

The connecting body 12 has the basic shape of a Steinmetz body which is formed by way of an intersection of two circular cylinders ("bicylinder"). The connecting body 12 therefore has first and second primary bearing faces 13, 14 which are formed by sections of a cylindrical surface which surrounds a first axis 17, and first and second secondary bearing faces 15, 16 which are formed by sections of a cylindrical surface which surrounds a second axis 18, the second axis 18 lying at a right angle with respect to the first axis 17.

Grooves 19, 20 are arranged in the primary and secondary bearing faces 13-16. The primary groove 19 penetrates the primary bearing faces 13, 14, lies in a plane which lies at a right angle with respect to the first axis 17, and runs via a vertex 22 of the connecting body 12, which vertex 22 faces the first connecting part 10. The secondary groove 20 penetrates the secondary bearing faces 15, 16, lies in a plane which lies at a right angle with respect to the second axis 18, and runs via a vertex 23 of the connecting body 12, which vertex 23 faces the second connecting part 11. In the exemplary embodiment, the primary groove 19 and the secondary groove 20 run in each case completely around the connecting body 12. They might also extend only in each case over regions of the respective bearing face 13-16 which adjoin the respective vertex 22, 23.

In the exemplary embodiment, the connecting body 12 has, furthermore, a through bore 21 which penetrates it and, for example, lies parallel to the second axis. Said through bore 21 might also be dispensed with.

The first connecting part 10 has two arm projections 24, 25 which enclose an intermediate space between them, in which the connecting body 12 is arranged. The second connecting part 11 has two arm projections 26, 27 which enclose an intermediate space between them, in which the connecting body 12 is arranged. The arm projections 24, 25 of the first connecting part have primary corresponding bearing faces 28, 29 which are formed by sections of a cylindrical surface which surrounds the first axis 17. The arm projections 26, 27 of the second connecting part 11 have secondary corresponding bearing faces 30, 31 which are formed by sections of a cylindrical surface which surrounds the second axis 18. The primary corresponding bearing faces 28, 29 bear against the primary bearing faces 13, 14 of the connecting body 12, and the secondary corresponding bearing faces 30, 31 bear against the secondary bearing faces 15, 16 of the connecting body 12.

Sections of the arm projections 24, 25 of the first connecting part 10 which adjoin the free ends of the arm projections 24, 25 approach one another in the direction of the free ends of the arm projections 24, 25, that is to say the intermediate space between the arm projections 24, 25 becomes narrower toward the free ends of the arm projections 24, 25. This applies analogously to the arm projections 26, 27 of the second connecting part 11. As a result, the first connecting part 10 is secured against being pulled off from the connecting body 12 in the direction of the longitudinal axis 32 of the first connecting part 10, that is to say also of the valve rod 4 (which lies at a right angle with respect to the first axis 17), and the second connecting part 11 is secured against the second connecting part 11 being pulled off from the connecting body 12 in the direction of the longitudinal axis 33 of the second connecting part 11 (which longitudinal axis 33 lies at a right angle with respect to the second axis 18).

A pin-shaped first clamping element 34 serves to prevent the first connecting part 10 being pulled off from the connecting body 12 in a direction parallel to the first axis 17. Said first clamping element 34 is arranged in a bore 36 of the first connecting part 10, which bore 36 runs at a right angle with respect to the first axis 17. In the middle region of its longitudinal extent, the bore 36 is open over a part of its circumference toward the connecting body 12, and the first clamping element 34 protrudes in a middle region of its longitudinal extent over a part of its diameter into the primary groove 19 of the connecting body 12.

A pin-shaped second clamping element 35 serves to prevent the second connecting part 11 being pulled off from the connecting body 12 in a direction parallel to the second axis 18. Said second clamping element 35 is arranged in a bore 37 of the second connecting part 11, which bore 37 extends at a right angle with respect to the second axis 18. In the middle region of its longitudinal extent, the bore 37 is open over a part of its circumference toward the connecting body 12, and the second clamping element 35 protrudes in a middle section of its longitudinal extent over a part of its diameter into the secondary groove 20.

The middle section of the first and of the second clamping element 34, 35 lies eccentrically with respect to the two end sections. After the respective clamping element 34, 35 is plugged into the respective bore 36, 37, the respective clamping element 34, 35 can therefore be braced against the connecting body 12 by way of rotation. The connecting body 12 is therefore clamped in between the clamping elements 34, 35 in the assembled state.

In order to assemble the connecting apparatus, the connecting body 12 is first of all pushed parallel to the first axis 17 into the intermediate space between the arm projections 24, 25 of the first connecting part 10, and is fixed there by way of plugging of the first clamping element 34 into the bore 36 and rotating of the first clamping element 34. As a consequence, the connecting body 12 which is mounted in the first connecting part 10 is pushed parallel to the second axis 18 into the intermediate space between the arm projections 26, 27 of the second connecting part 11, and the second clamping element 35 is plugged into the bore 37 and is clamped against the connecting body 12 by way of rotation. A reverse assembly sequence (first of all, connection of the connecting body to the second connecting part 11 and then to the first connecting part 10) is also of course conceivable and possible.

When, after assembly of the connecting apparatus, the closure member 1 is displaced for the first time into the closed position, the closure member 1 can be adapted to the angular position of the valve seat, with the result that even great tolerances can be compensated for. Here, the first connecting part 10 can be pivoted with respect to the connecting body 12 about the first axis 17, with the friction between said two parts being overcome, and/or the valve body 12 can be pivoted with respect to the second connecting part 11 about the second axis 18, with the friction between said two parts being overcome. As a consequence, the orientation of the second connecting part 11 with respect to the first connecting part 12 is maintained on account of the friction which holds the connecting body 12 in its current position.

Figure 16:
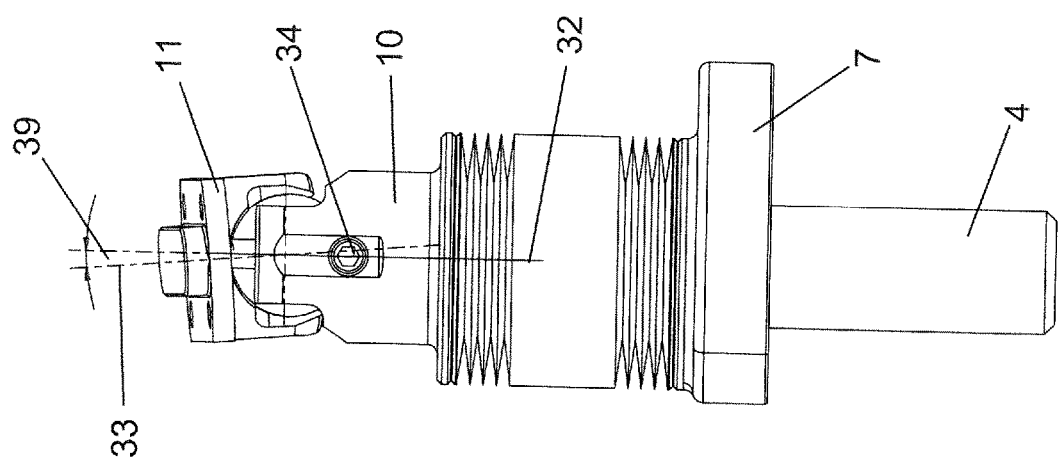
FIGS. 15 and 16 show illustrations in an analogous manner with respect to FIGS. 6 and 8, but in the pivoted state of the second connecting part with respect to the first connecting part.
Figure 15:
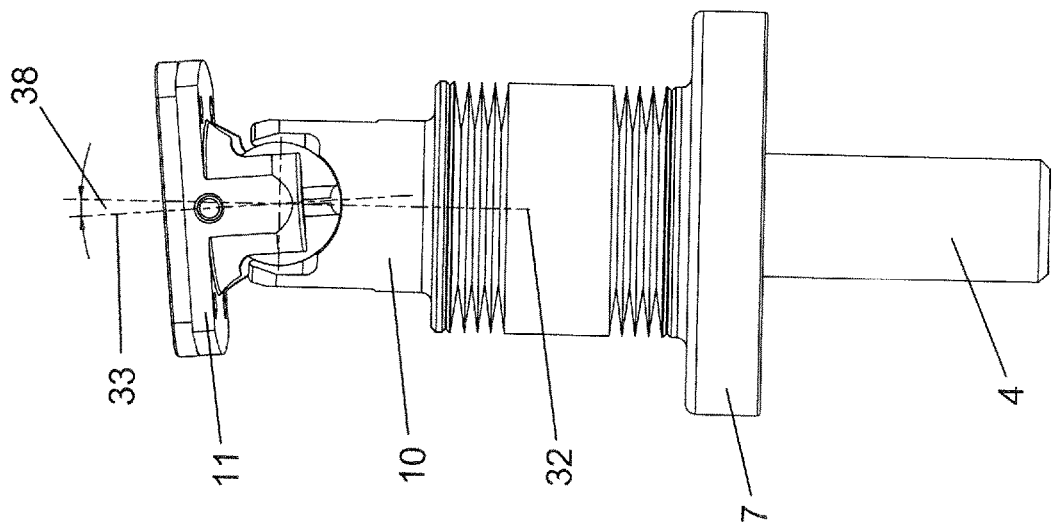

For illustrative purposes, FIGS. 15 and 16 show a position of the second connecting part 11, in which position said second connecting part 11 is pivoted by an angle 38 about the first axis 17 and by an angle 39 about the second axis 18 with respect to the first connecting part, the pivoting angles being shown in a greatly exaggerated manner in comparison with ratios which usually occur in practice.

Figure 17:
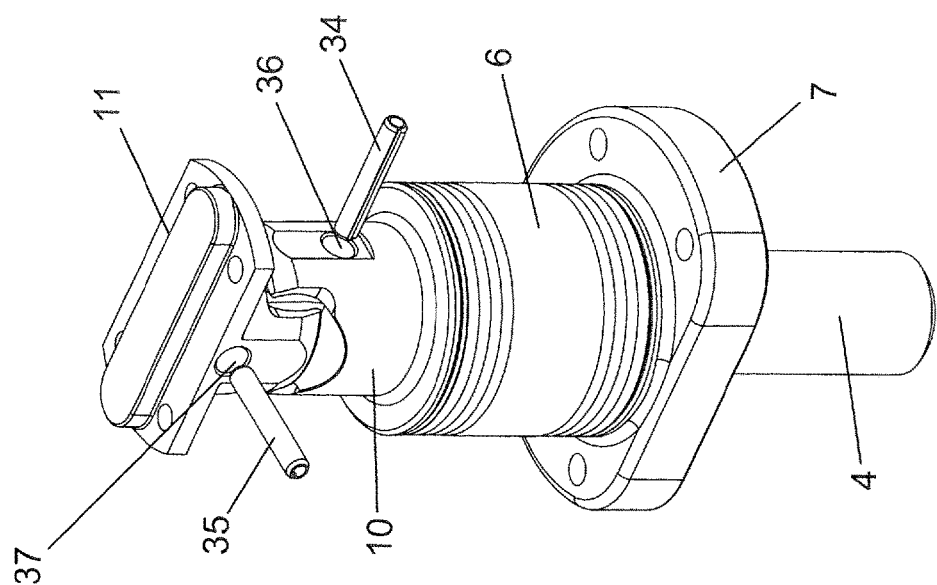
FIG. 17 shows a second exemplary embodiment of the invention.

One modified exemplary embodiment of the invention is shown in FIG. 17. The difference to the above-described exemplary embodiment consists in that spiral pins (also called heavy-type dowel pins) are provided here as clamping elements 34, 35. They are of sleeve-shaped configuration and have an axial slot which is continuous over their longitudinal extent. After said clamping elements 34, 35 are pressed into the bores 36, 37, the connecting body 12 is therefore already clamped between the clamping elements 34, 35, without it being necessary for the clamping elements 34, 35 to still have to have been rotated about the axis thereof Different further modifications of the illustrated exemplary embodiment of the invention are conceivable and possible, without departing from the scope of the invention. For example, the first and second clamping elements 34, 35 might also be of different configuration than pin-shaped. The connection to the first and second connecting parts 10, 11 might then be configured in another way. For example, clamping elements, for example of spherical configuration, might be arranged in recesses of the first and second connecting part 10, 11, and might be pressed against the bottom of the respective groove 19, 20 by way of a respective spring element.

If a sufficient frictionally locking connection is configured between the connecting body 12 and the first connecting part 10 and second connecting part 11 even without the first and/or second clamping element 34, 35, the first and/or second clamping element 34, 35 might also be dispensed with.

Key to the Designations
1 Closure member
2 Valve opening
3 Body
4 Valve rod
5 Drive
6 Boot
7 Flange
8 Seal
9 Connector piece
10 First connecting part
11 Second connecting part
12 Connecting part
13 Primary bearing face
14 Primary bearing face
15 Secondary bearing face
16 Secondary bearing face
17 First axis
18 Second axis
19 Primary groove
20 Secondary groove
21 Through bore
22 Vertex
23 Vertex
24 Arm projection
25 Arm projection
26 Arm projection
27 Arm projection
28 Primary corresponding bearing face
29 Primary corresponding bearing face
30 Secondary corresponding bearing face
31 Secondary corresponding bearing face
32 Longitudinal axis
33 Longitudinal axis
34 First clamping element
35 Second clamping element
36 Bore
37 Bore
38 Angle
39 Angle

The invention claimed is:

1. A connecting apparatus for the connection of a valve rod to a closure member of a vacuum valve, the connecting apparatus comprising
a first connecting part which is at least one of connectable to, connected with, or configured in one piece with the valve rod,
a second connecting part which is at least one of connectable to, connected with, or configured in one piece with the closure member,
a connecting body arranged between the first connecting part and the second connecting part,
the connecting body has a basic shape of a Steinmetz body which is formed by way of a intersection of two circular cylinders, said Steinmetz body including primary bearing faces formed by sections of a first cylindrical surface which surrounds a first axis and secondary bearing faces formed by sections of a second cylindrical surface which surrounds a second axis which lies at a right angle with respect to the first axis, and
the first connecting part includes first arm projections, between which a first intermediate space lies, in which the connecting body is arranged, and the second connecting part has second arm projections, between which a second intermediate space lies, in which the connecting body is arranged, the first arm projections of the first connecting part having primary corresponding bearing faces which are formed by sections of a third cylindrical surface which surrounds the first axis and bear against the primary bearing faces of the connecting body, and the second arm projections of the second connecting part having secondary corresponding bearing faces which are formed by sections of a fourth cylindrical surface which surrounds the second axis and bear against the secondary bearing faces of the connecting body, and the first arm projections of the first connecting parts approach one another in sections, which adjoin free ends of the first arm projections of the first connecting part, toward the free ends of the first arm projections of the first connecting part, and the second arm projections of the second connecting part approach one another in sections, which adjoin free ends of the second arm projections of the second connecting part, toward the free ends of the second arm projections of the second connecting part.

2. The connecting apparatus as claimed in claim 1, further comprising a primary groove in the connecting body, the primary groove lies in a plane which lies at a right angle with respect to the first axis, a first clamping element which is fastened to the first connecting part protrudes into the primary groove, and a secondary groove in the connecting body, the secondary groove lies in a plane which lies at a right angle with respect to the second axis, and a second clamping element which is fastened to the second connecting part protrudes into the secondary groove.

3. The connecting apparatus as claimed in claim 2, wherein the first clamping element has a pin-shaped configuration and is arranged in a bore in the first connecting part, and the second clamping element has a pin-shaped configuration and is arranged in a bore in the second connecting part.

4. The connecting apparatus as claimed in claim 3, wherein the first clamping element has a diameter and protrudes in a middle section of a longitudinal extent of the first clamping element at least over a part of the diameter into the primary groove, and the second clamping element has a diameter and protrudes in a middle section of a longitudinal extent of the second clamping element at least over a part of the diameter into the secondary groove.

5. The connecting apparatus as claimed in claim 3, wherein the bore in the first connecting part extends at a right angle with respect to the first axis, and the bore in the second connecting part extends at a right angle with respect to the second axis.

6. The connecting apparatus as claimed in claim 2, wherein the primary groove extends via a first vertex of the connecting body, said vertex faces the first connecting part, and extends at least over those regions of the primary bearing faces which adjoin said first vertex of the connecting body on opposite sides, and the secondary groove extends via a second vertex of the connecting body, said second vertex faces the second connecting part, and extends at least over regions of the secondary bearing faces which adjoin said second vertex of the connecting body on opposite sides.

7. The connecting apparatus as claimed in claim 2, wherein the connecting body is clamped between the first clamping element and the second clamping element.

8. The connecting apparatus as claimed in claim 4, wherein the middle sections of the first clamping element and the second clamping element lie eccentrically with respect to the two end sections of the respective clamping element.

9. The connecting apparatus as claimed in claim 2, wherein the first clamping element and the second clamping element are each configured as a spiral pin.

10. A vacuum valve comprising a closure member which is supported by a valve rod and is adjustable between an open position, in which a valve opening can be released, and a closed position, in which the valve opening can be closed by the closure member, the closure member being connected to the valve rod via a connecting apparatus as claimed in claim 1.

\* \* \* \* \*